United States Patent
Ensworth

(10) Patent No.: US 12,120,989 B2
(45) Date of Patent: Oct. 22, 2024

(54) IRRIGATION SPOUT CLIP AND RELATED METHODS

(71) Applicant: Rain Bird Corporation, Azusa, CA (US)

(72) Inventor: Mark Murphy Ensworth, Orange, CA (US)

(73) Assignee: Rain Bird Corporation, Azusa, CA (US)

( * ) Notice: Subject to any disclaimer, the term of this patent is extended or adjusted under 35 U.S.C. 154(b) by 196 days.

(21) Appl. No.: 17/570,023

(22) Filed: Jan. 6, 2022

(65) Prior Publication Data

US 2023/0210065 A1     Jul. 6, 2023

(51) Int. Cl.
*A01G 25/02*     (2006.01)
*B05B 15/658*     (2018.01)

(52) U.S. Cl.
CPC .......... *A01G 25/023* (2013.01); *B05B 15/658* (2018.02)

(58) Field of Classification Search
CPC .... B05B 15/658; A01G 25/023; A01G 25/026
USPC .......... 239/271, 272, 542, 547, 588
See application file for complete search history.

(56) References Cited

U.S. PATENT DOCUMENTS

| | | | |
|---|---|---|---|
| 4,128,918 A | 12/1978 | Wenk | |
| 4,147,307 A | 4/1979 | Christy | |
| 4,190,206 A * | 2/1980 | Atkinson | A01G 25/023 239/547 |
| 4,392,616 A | 7/1983 | Olson | |
| 4,846,406 A * | 7/1989 | Christy | B05B 1/3006 239/542 |
| 4,935,992 A | 6/1990 | Due | |
| 5,052,625 A | 10/1991 | Ruskin | |
| 5,118,215 A | 6/1992 | Freier | |
| 5,216,784 A | 6/1993 | Dyer | |
| 5,253,807 A | 10/1993 | Newbegin | |
| 5,279,460 A | 1/1994 | Yu | |
| 5,340,027 A | 8/1994 | Yu | |
| 5,400,967 A | 3/1995 | Yu | |
| 5,423,501 A | 6/1995 | Yu | |
| 5,474,268 A | 12/1995 | Yu | |
| 5,694,972 A * | 12/1997 | King | A01G 25/023 285/423 |
| 5,829,686 A | 11/1998 | Cohen | |

(Continued)

OTHER PUBLICATIONS

Patent Cooperation Treaty, Written Opinion of the International Searching Authority for International Application No. PCT/US2013/046603 dated Sep. 19, 2013, 4 pages.

(Continued)

*Primary Examiner* — Steven J Ganey
(74) *Attorney, Agent, or Firm* — Fitch, Even, Tabin & Flannery, LLP

(57) ABSTRACT

A spout clip is provided including a spout and a tube clip. The spout is coupled to the tube clip. The tube clip is configured to attach to a sidewall of a water supply line to secure the spout to the line. The water supply line may include a water discharge hole, and the spout clip may be positioned at the hole. An emitter inside the line may also be positioned at the hole. The spout clip may be attached to the fluid supply tube at the hole to bring the spout of the spout clip into fluid communication with the outlet of the emitter and to distribute water from the line from a location spaced apart from the line.

16 Claims, 4 Drawing Sheets

(56) References Cited

U.S. PATENT DOCUMENTS

| | | | |
|---|---|---|---|
| 5,878,963 A | 3/1999 | Bates | |
| 6,052,873 A | 4/2000 | Cuno | |
| 6,095,185 A | 8/2000 | Rosenberg | |
| 6,164,605 A | 12/2000 | Drake | |
| 6,343,616 B1 | 2/2002 | Houtchens | |
| 6,581,854 B2 | 6/2003 | Eckstein | |
| 7,284,302 B2 | 10/2007 | Lares | |
| 7,648,085 B2 | 1/2010 | Mavrakis | |
| 8,220,727 B2 | 7/2012 | Lee | |
| 8,302,887 B2 | 11/2012 | Park | |
| 8,672,240 B2* | 3/2014 | Masarwa | B05B 1/202 239/542 |
| 9,253,951 B2 | 2/2016 | Herrera | |
| 9,877,442 B2 | 1/2018 | Kim | |
| 10,161,553 B2* | 12/2018 | Nourian | F16L 41/065 |
| 10,440,903 B2 | 10/2019 | Kim | |
| 10,842,090 B2 | 11/2020 | Mavrakis | |
| 2002/0104902 A1 | 8/2002 | Eckstein | |
| 2005/0258278 A1 | 11/2005 | Cohen | |
| 2008/0099584 A1 | 5/2008 | Raanan | |
| 2008/0257991 A1 | 10/2008 | Einav | |
| 2010/0282873 A1 | 11/2010 | Mattlin | |
| 2013/0248616 A1 | 9/2013 | Ensworth | |
| 2013/0248622 A1 | 9/2013 | Kim | |
| 2013/0341431 A1 | 12/2013 | Ensworth | |
| 2016/0146388 A1* | 5/2016 | Smith | A01G 25/023 285/133.11 |
| 2021/0237217 A1 | 8/2021 | Giuffrè | |

OTHER PUBLICATIONS

Rain Bird Corporation, Clip Plugs, [online]. Retrieved from the Internet: <URL: https://www.rainbird.com/products/clip-plugs> on Aug. 28, 2024, 3 pages. Available publicly before the filing date.

* cited by examiner

IRRIGATION SPOUT CLIP AND RELATED METHODS

FIELD

This disclosure relates to irrigation systems and, more particularly, to drip emitter systems.

BACKGROUND

Drip emitters are generally known in the field of irrigation for use in delivering irrigation water to a precise point at a predetermined and relatively low volume flow rate, thereby conserving water. Emitters are connected to a water supply tube through which irrigation water is supplied under pressure. The drip emitter taps a portion of the relatively high-pressure irrigation water from the supply tube for flow through a flow path to achieve a desired pressure drop prior to discharge at a target trickle or drip flow rate.

In a conventional system, multiple emitters are mounted at selected positions along the length of the dripline to deliver the irrigation water to specific points, such as directly to a plurality of individual plants. In some forms, emitters are spaced apart at regular intervals along the dripline, which may depend on the desired amount of irrigation. Each emitter generally includes an inlet to receive water flowing through the dripline, a flow path to reduce water pressure, and an outlet to emit water from the dripline at a specific rate for irrigation. In many in-line emitter systems, where the emitter is mounted at regular intervals within the dripline, water flows out of the outlet of the emitter and exits the water supply tube through a hole in the side of the water supply tube.

One known shortcoming with existing systems is that, due to the low velocity at which the fluid exits the hole of the supply tube, the water can adhere to the outer surface of the tube and travel along the outer surface of the tube. As a result, much of the water flowing out of the hole of the supply tube travels along the tube away from the hole rather than watering the area adjacent the hole of the supply tube. For example, where emitters are positioned along the water supply tube to directly water plants, much of the water travels along the outer surface of the water supply tube and away from the plants rather than directly watering the plant.

DETAILED DESCRIPTION

With respect to FIGS. 1-4, there is provided spout clip 10 with a spout 12 and a tube clip 14. The spout clip 10 attaches via the tube clip 14 to a dripline or water supply line 22 having a hole 40 in a sidewall for distributing water for irrigation. The spout clip 10 attaches to the line 22 via the tube clip 14 to fluidly connect the spout 12 to the hole of the line 22. Once the spout clip is connected to the line 22, water discharges from spout 12, which limits and even prevents the water from flowing along an outer surface of the line 22. This helps ensure that the water is focused on the watering target. Watering with increased accuracy is advantageous because it reduces unnecessary watering and increases the likelihood of healthy vegetation.

Figure 1:
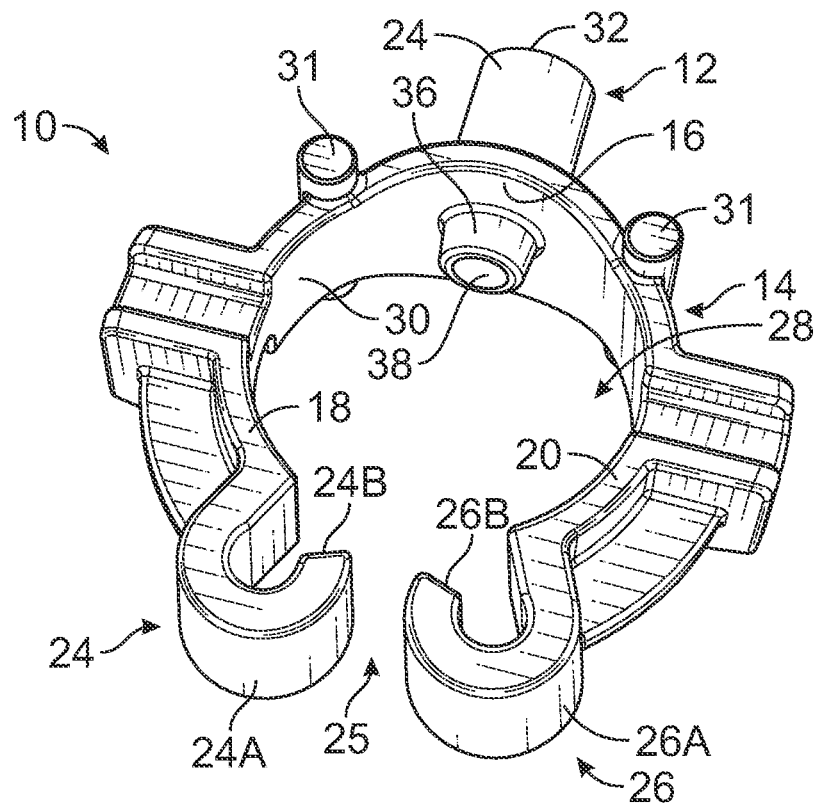
FIG. 1 is a bottom perspective view of a spout clip.
Figure 2:
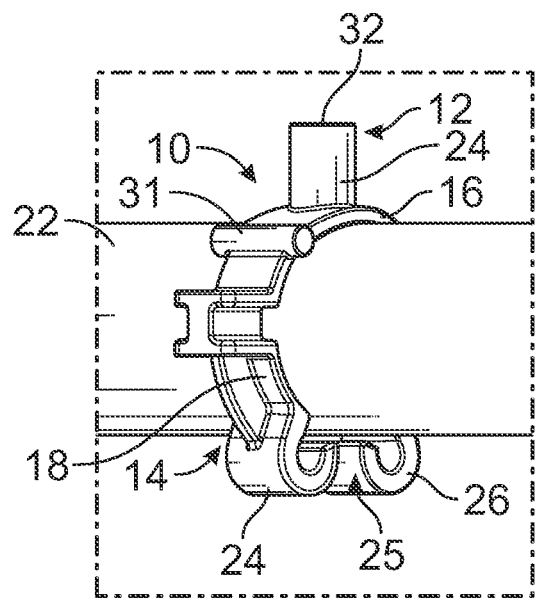
FIG. 2 is a front perspective view of the spout clip of FIG. 1 attached to tubing.
Figure 3:
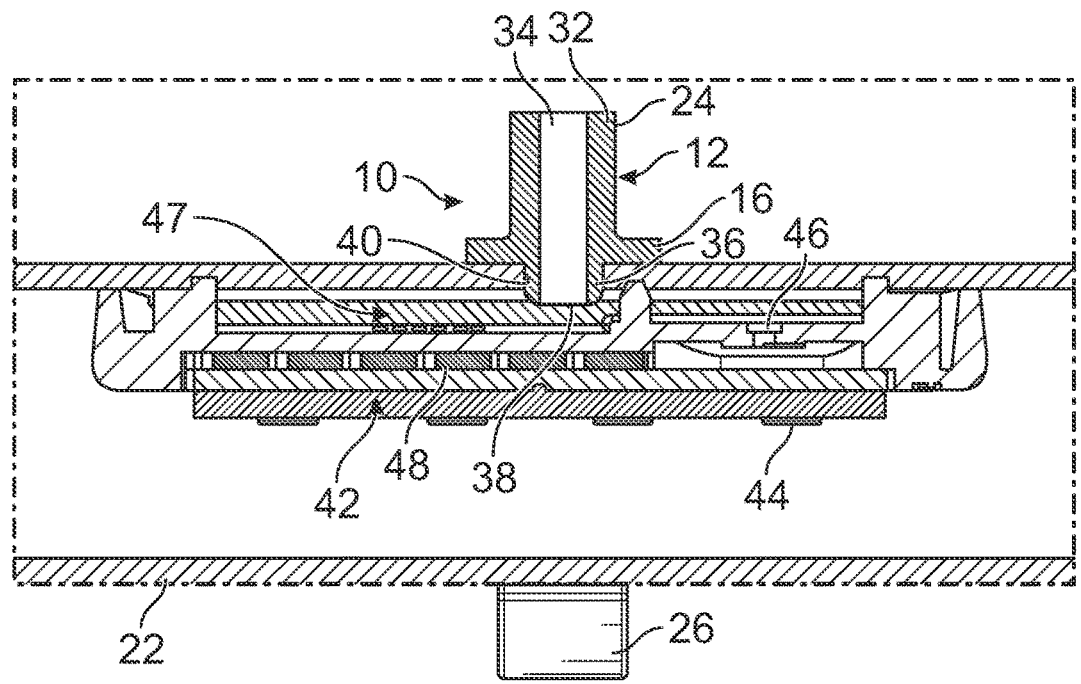
FIG. 3 is a side cross-sectional view of the spout clip of FIG. 1 attached to tubing.

More specifically, as shown in FIG. 1, the tube clip 14 includes a base 16 and two opposing arms 18, 20. The first arm 18 extends from one side of the base 16 and the second arm 20 extends from the other side of the base portion 16. As shown, the first arm 18 extends from the base 16 to a rounded end 24, and the second arm 20 also extends from the base 16 to a rounded end 26.

The first and second arms 18, 20 are arcuate and form a central opening 28 for receiving the line 22. The first and second arms 18, 20 both extend from the base 16 away from one another before curving back toward one another. The radius of curvature of the first and second arms 18, 20 may correspond substantially to a radius of curvature of an outer surface of the line 22 (see FIG. 4).

The rounded ends 24, 26 define a gap 25 through which the line 22 passes when attaching the tube clip 14 to the line 22. The first and second arms 18,20 are elastically deflectable so that when a force is applied to the rounded ends 24, 26 of one or both of the first and second arms 18,20 the size of the gap 25 increases. When the force is removed, the first and second arms 18, 20 elastically return toward their original shape. The gap 25 may normally be smaller than the diameter of the line 22 prior to installation on the line 22 and may be larger than the diameter of the line 22 after installation. When installed, the first and second arms 18, 20 may wrap at least partially about the line 22 extending through the central opening to secure the spout clip 10 to the line 22.

The spout 12 and tube clip 14 may be formed from plastic material including, as examples, acetal, ABS, polypropylene, and polyethylene.

To attach the tube clip 14 to the supply tube 22, the rounded ends 24, 26 of the first and second arms 18, 20 are forced against the rounded outer surface of the line 22. The engagement of the rounded ends portions 24, 26 against the rounded outer surface of the line 22 causes the first and second arms 18, 20 to deflect away from one another, thereby increasing the size of the gap 25. The rounded ends 24, 26 are forced to pass over the widest portion of the supply tube 22 at which point the first and second arms 18, 20 begin to elastically return toward their original positions with the line 22 extending through the central opening 28 (as in FIG. 2). With the supply tube 22 in the central opening 28, the first arm 18 and second arm 20 may not be able to entirely return to their original shape and, thus, may apply a force to the outer surface of the supply tube 22, thereby clamping the tube clip to the line 22. The clamping force increases the frictional engagement between the tube clip 14 and the line 22, which helps to prevent the tube clip 14 from unintentional movement along the line 22.

The base 16, the first arm 18, and the second arm 20 include an inner surface 30 that defines the central opening 28 of the tube clip 14. The portion of the inner surface 30 at the base 16 is wider in an axial direction than the portions of the inners surface 30 at the first and second arms 18, 20. The increased width helps to prevent the tube clip 14 from moving or pivoting relative to the line 22. The diameter of the central opening 28 may be designed to receive tubes having a range of diameters. This would enable the same spout tube clip 10 to be used with different sized lines. For example, the opening 28 could be adjustable though movement of the first and second arms 18,20 to accommodate lines with outer diameters in the range of 16 mm to about 18 mm. The inner surface 30 is rounded and smooth such that when viewed axially (see FIG. 4) the inner surface 30 has a substantially circular or oval shape. In other configurations, however, the inner surface 30 may include flat surfaces such that when viewed axially the inner surface 30 has a hexagonal, octagonal, or other polygonal shape or portion thereof.

As illustrated, the inner surface 30 is a continuous surface extending along the first arm 18, the base 16, and second arm 20. In other configurations, the inner surface 30 may be discontinuous, having gaps between different portions of the inner surface 30. For example, the inner surface 30 may include a first portion along the first arm 18 separated by a gap from a second portion extending along the second arm 20. Including gaps between portions of the inner surface 30 may aid in controlling the flexibility of the deflectable arms 18, 20. The gaps, thickness in material, and other features on the tube clip 14 can be used to control the flexibility and clamping ability of the tube clip 14. For instance, the tube clip 14 includes ribs 31 extending axially and separating each of the first and second arms 18, 20 from the base 16. Each rib 31 acts as a natural hinge to control and strengthen the connection of the first and second arms 18, 20 with the base 16.

The rounded ends 24, 26 provide outer camming surfaces that assist in attaching the spout clip 10 to the line 22. The rounded ends 24, 26 slide over the outer surface of the line 22 with relatively low frictional resistance. As the rounded ends 24, 26 are forced against the line 22, they track the outer surface of the line 22, thereby forcing the deflectable arms 18, 20 apart from one another to allow the line 22 to pass through the gap 25 and into the central opening 28 of the tube clip 14.

The rounded ends 24, 26 may be hooked shaped with a rounded head 24A, 26A and a hooking tip 24B, 26B. So configured, the rounded ends 24, 26 may permit the spout clip 10 to be secured to the line 22 with less force than that required to remove the spout clip 10 from the line 22. Consistent with the above discussion, the rounded heads 24A, 26A may be forced against the sidewall of the line 22 to splay or spread the arms 18, 20 apart from one another. The curved surface of the rounded heads 24A, 26A slide over the outer surface of the line 22 until the widest part of the line 22 passes the hooking tips 24B, 26B and the line 22 passes into the central opening 28.

In removing the line 22 from the central opening 28, the outer surface of the supply tube 22 engages the hooking tips 24B, 26B, thus requiring additional force to spread the hooking tips 24B, 26B apart. One may apply a force manually (e.g., by using their hands or other tool) to spread the hooking tips 24A, 24B.

Figure 4:
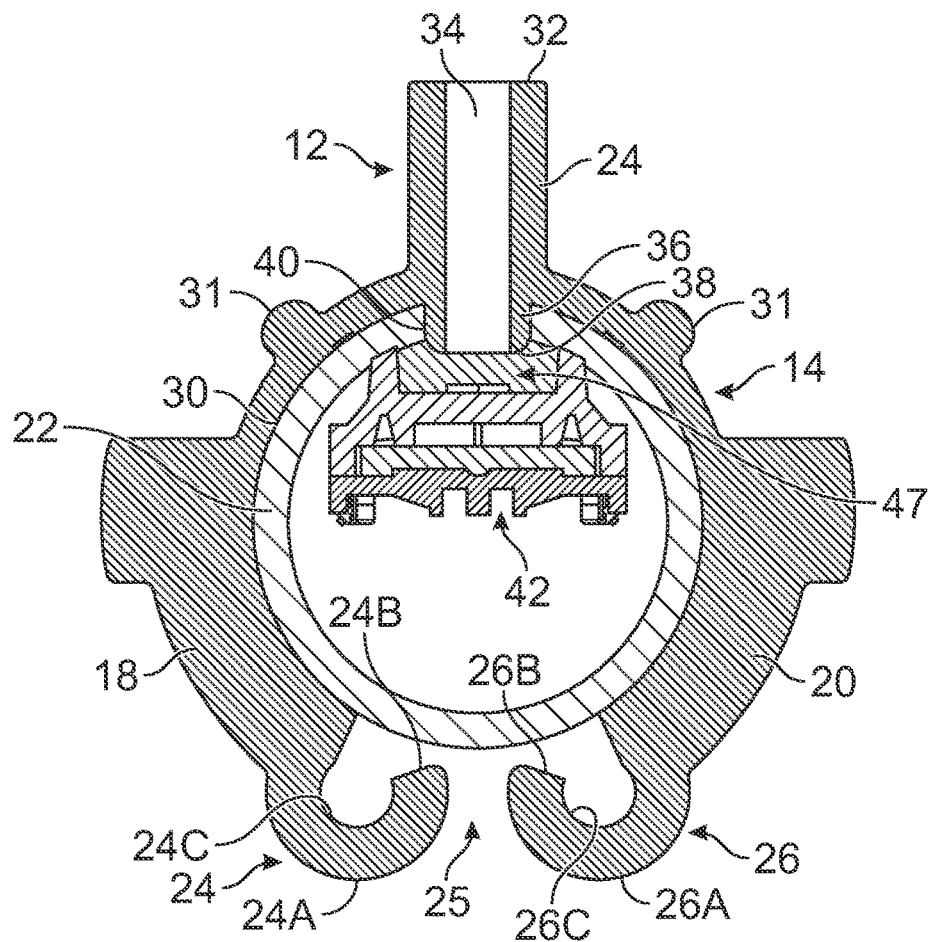
FIG. 4 is a front cross-sectional view of the spout clip of FIG. 1 attached to tubing.

The hook shape of the rounded ends 24, 26 enable the spout clip 10 to be hung from a wire. For example, the spout clip 10 may be hung from a wire of a trellis system to elevate the spout clip 10 and the line 22 from the ground. To hang the line 22 from the wire, one or more spout clips 10 are attached to the line 22 with one of the rounded ends 24, 26 of each spout clip 10 hooked to the wire. With reference to FIG. 4, the wire may be passed through the gap 25 of the spout clip 10 and in between one of the hooking tips 24B, 26B and the line 22. An internal surface 24C, 26C of the rounded head 24A, 26A rests on the wire to hang the spout clip 10, and the line 22 to which the spout clip 10 is attached, from the wire. When hung, the spout 12 of the spout clip 10 is oriented downward and toward the ground. Water flows through the line 22 and out the spout 12 to water the ground below the line.

In other configurations, the rounded end portions 24, 26 may not be hooked shaped. For instance, the end portions 24, 26 may be cylindrical and have a smooth transitional surface. With a smooth transitional surface to the rounded end portions 24, 26, the spout clip 10 may be removed from the line 22 with approximately the same amount of force as required to attach the spout clip 10 to the line 22.

The spout 12 is attached to the base 16 of the tube clip 14. The spout 12 may be formed unitarily or as a single piece with the tube clip 14. Alternatively, the spout 12 may be a separate component from the tube clip 14 and attached to or inserted into the tube clip 14.

The spout 12 includes a tube 24 that extends from the base 16 of the tube clip 14 to an outlet end 32. The tube 24 defines a passage 34 therethrough for water flow. More specifically, the tube 24 and its passage 34 extend through the base portion 16 of the tube clip 14 so that fluid flows through the base 16 and to the outlet end 32. While the spout 12 is generally tubular in shape, it may be any of various cross-sectional shapes and sizes.

The tube 24 may extend radially inward from the base 16 to form an insertion portion 36 in the central opening 28. The insertion portion 36 may be an annular ring that extends from the inner surface 30 of the base 16 of the tube clip 14. The insertion portion 36 may define an inlet end 38 of the tube 24 through which fluid enters the spout 12 and flows to the outlet end 32. The insertion portion 36 of the spout 12 may be inserted into a hole 40 in the sidewall of the line 22 when the spout clip 10 is attached to the line 22. The insertion portion 36 also may extend into an outlet bath 47 of an emitter inside the line 22 at the hole 40. Having the inlet end 38 of the tube 24 at least partially within the line 22 provides direct water flow through the spout 12. The insertion portion 36 may further form a sealed connection with material of the line 22 forming the hole 40. This sealed connection prevents water from leaking between the line 22 and an outer surface of the insertion portion 36.

The outer surface of the insertion portion 36 at the inlet end 38 may be tapered or chamfered. The tapered outer surface aids in inserting the insertion portion 36 into the hole 40 of the line 22. The tapered insertion portion 36 also may aid in forming a seal with the hole 40 of the line 22. For instance, a wider portion of the insertion portion 36 follows the tapered outer surface. Thus, the tapered outer surface leads the wider portion into the hole 40, causing the hole 40 to stretch around the wider portion of the insertion portion 36 to form a seal therewith.

In some forms, the insertion portion 36 and/or the base 16 may include a separate seal that engages the line 22 to further prevent water from flowing around the insertion portion 36 and/or the tube clip 14. With the insertion portion 36 extending into hole 40, the spout clip 10 is prevented from unintentionally sliding along the axis of the line 22 and rotating about the line 22.

The line 22 may be part of an irrigation system and connected to a water source that is configured to pump water through the line 22. The holes 40 of the line 22 may be positioned adjacent target locations desired to be watered, for example, to target vegetation for irrigation. The supply tube 22 may include an emitter 42 (see FIGS. 3-4) disposed within the supply tube 22 at each hole 40. It is contemplated that any of various types of emitters may be used. In this regard, some non-limiting examples of emitters are described in U.S. Pat. Nos. 7,648,085; 8,302,887; and 10,842,090, all of which are incorporated by reference herein in their entirety.

Each emitter 42 includes an inlet 44 through which water in the line 22 enters and an outlet 46 through which water exits the emitter at a specific rate for irrigation. The emitter 42 typically receives fluid through the inlet 44 at a first pressure and emits it at a second pressure which is less than the first pressure. The emitter 42 includes a flow path 48 designed to reduce the pressure of water between the inlet 44 and the outlet 46. Water exits the outlet 46 of the emitter 42 into an outlet bath 47 (the area between the emitter and the inside surface of the line 22). The outlet bath 47 communicates with the hole 40 of the line 22. Thus, when the spout clip 10 is attached to the line 22 with the spout 12 aligned with the hole 40, the insertion portion 36 of the spout is preferably disposed in the outlet bath 47 of the emitter 42. Water flows from the emitter 42 and through the spout 12 of the spout clip 10.

In use, the spout clip 10 may be brought proximate a hole 40 of a line 22. The rounded ends 24, 26 of the tube clip 14 are forced against the outer surface of the line 22 to deflect the arms 18, 20 away from one another. The spout clip 10 may be forced toward the line 22 until the line 22 passes through the gap 25 between the rounded ends 24, 26 and into the central opening 28 of the spout clip 10. The spout 12 of the spout clip 10 is preferably aligned with a hole 40 of the line 22 to place the inlet end 38 of the tube 12 in fluid communication with the line 22. For example, the insertion portion 36 of the spout 12 may be inserted through the hole 40 into the outlet bath 47 of the emitter 42. Water in the line 22 flows through the emitter 42 and then into the spout 12 of the spout clip 10. Water drips from the spout 12 to provide irrigation. Because the water flows through the spout 12, the water is discharged from a location spaced from the outer surface of the line 22. As a result, the water drips on the target location and does not adhere to and travel along the outer surface of the supply tube 22 away from the target location.

In some forms, distribution tubing may be attached to the tube 24 of the spout 12 to direct the water to a desired location remote from the spout 12. More specifically, one end of a distribution tube may be attached to the spout 12 with the other end positioned at a specific location desired to be irrigated (e.g., roots of a plant). The outer diameter of the tube 24 of the spout 12 may be sized such that distribution tube may slide over the tube 24 forming a friction seal with the tube 24. For example, the outer diameter of the tube 24 of the spout 12 may be 0.25 inches such that the tube 24 of the spout 12 may be inserted into an end of ¼ inch distribution tubing with an inner diameter smaller than 0.25 inches (e.g., 0.17 inches).

Figure 5:
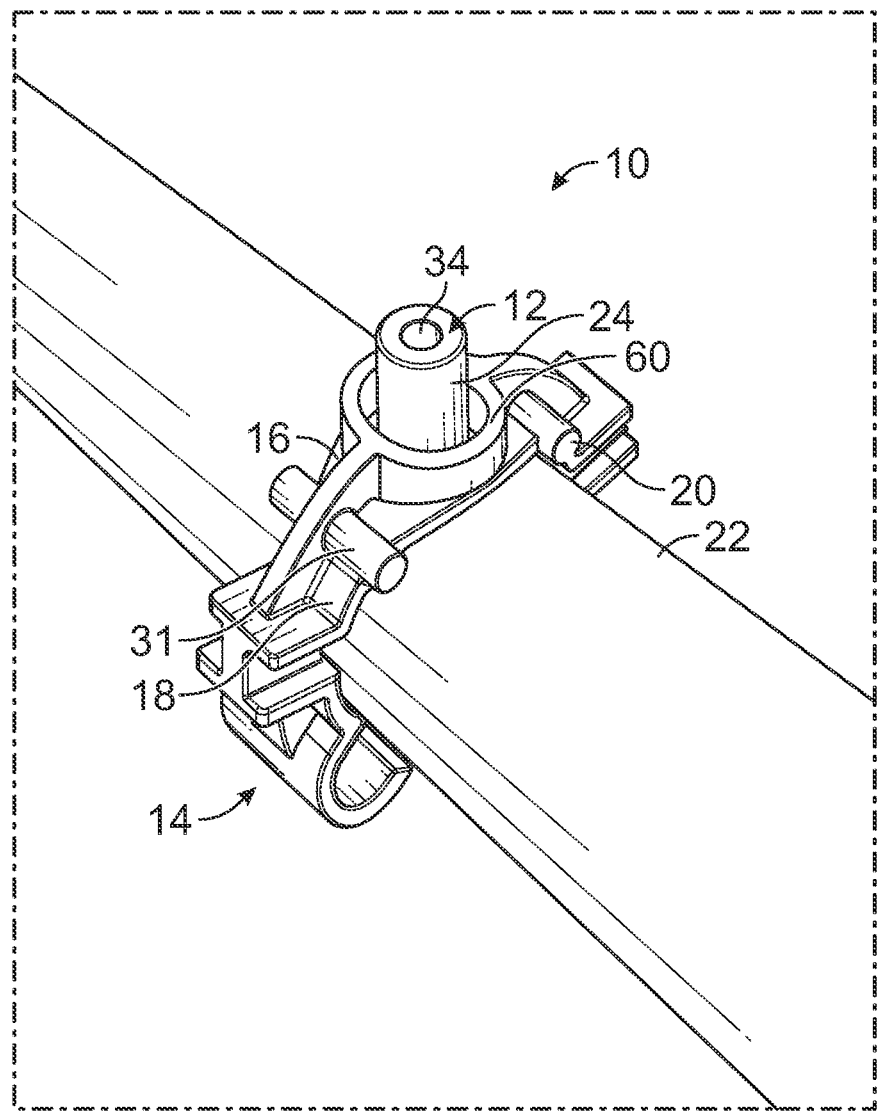
FIG. 5 is a top perspective view of a spout clip according to another embodiment attached to tubing.

With respect to FIG. 5, the spout clip 10 may further include an annular rib or ring 60 extending from the base 16 of the tube clip 14 around the tube 24 of the spout 12. The annular ring 60 may be concentric with the tube 24 of the spout 12 and form a space therebetween for receiving the distribution tube. The base 16 of the spout clip 10 is wider in an axial direction than the first and second arms 18, 20. The increased width allows the annular ring 60 to be spaced apart from the spout 12 to allow the distribution tubing to be attached to the spout 12. A distribution tube may thus be slid over the tube 24 of the spout 12 with the end of the distribution tube being inserted into the annular ring 60. The inner diameter of the annular ring 60 may be slightly smaller than the outer diameter of the distribution tubing to further increase the frictional engagement between the spout clip 10 and the distribution tube. This secondary frictional engagement also may provide another seal between the spout clip 10 and the distribution tube. The annular ring 60 further increases the stiffness of the spout clip 10. The increased stiffness from the rib 60 forces the arms 18, 20 of the tube clip 14 towards their original positions and increases the resistance in flexing the arms 18, 20 away from one another. This increased stiffness improves the grip of the tube clip 14 of the spout clip 10 on a dripline which prevents the spout clip 10 from being unintentionally removed.

Figure 6:
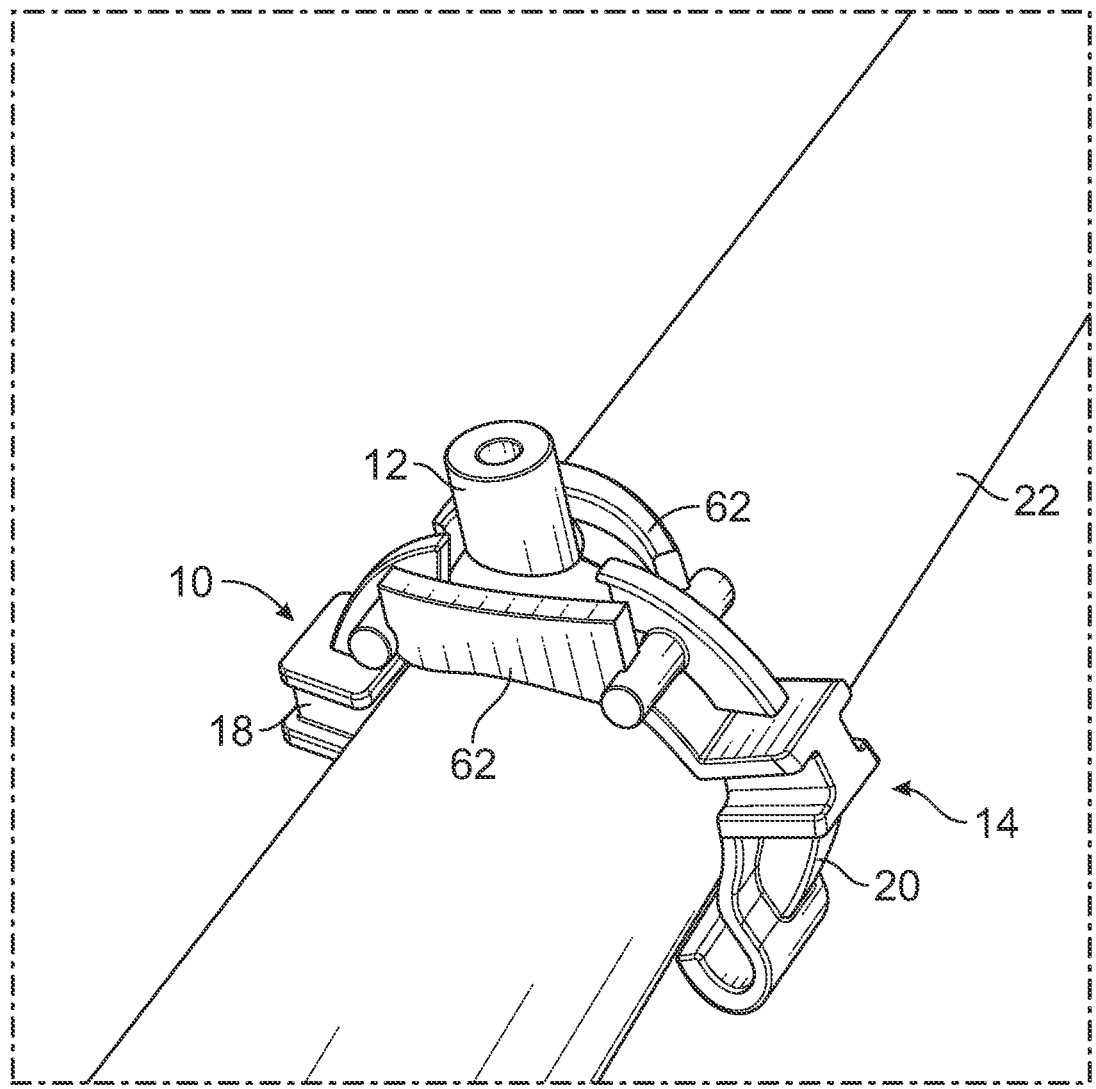
FIG. 6 is a top perspective view of a spout clip according to another embodiment attached to tubing.

With reference to FIG. 6, the spout clip 10 may include arcuate ribs 62 extending from the base 16 of the tube clip 14 and around the tube 24 of the spout 12. The ribs 62 provide increased stiffness to the tube clip 14 of the spout clip 10. The increased stiffness from the ribs 62 forces the arms 18, 20 of the tube clip 14 towards their original positions and increases the resistance in flexing the arms 18, 20 away from one another. This increased stiffness improves the grip of the tube clip 14 of the spout clip 10 on a dripline which prevents the spout clip 10 from being unintentionally removed. The ribs 62 may be spaced apart from the tube 24 to permit distribution tubing to be attached to the tube 24.

While there have been illustrated and described particular embodiments of the present invention, those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An irrigation system comprising:
   a dripline having a sidewall defining at least one hole;
   at least one drip emitter disposed within the dripline, the at least one drip emitter in fluid communication with the at least one hole; and
   a spout clip including a tube and a clip, the clip attaching the spout clip to the sidewall of the dripline at the at least one hole to position the tube into fluid communication with the dripline.

2. The irrigation system of claim 1 wherein the tube includes an insertion portion sized to be inserted into the at least one hole in the dripline.

3. The irrigation system of claim 2 wherein the insertion portion includes a tapered portion.

4. The irrigation system of claim 1 wherein the tube clip includes a first arm and a second arm and at least one of the first arm and second arm is moveable relative to the other of the first arm and second arm.

5. The irrigation system of claim 4 wherein the first arm and second arm are curved to define an opening therebetween.

6. The irrigation system of claim 4 wherein the first arm includes a first end, the second arm includes a second end, the first end and the second end define a gap therebetween, and the gap having a first dimension.

7. The irrigation system of claim 6 wherein at least one of the first end and the second end includes a camming surface for changing the first dimension to a second dimension.

8. The irrigation system of claim 6 wherein at least one of the first end and second end includes a stop for prohibiting changing the second dimension.

9. The irrigation system of claim 1 wherein the tube includes an inlet sized to be received in the at least one hole of the dripline.

10. The irrigation system of claim 9 wherein the inlet includes a tapered outer surface.

11. The irrigation system of claim 1 wherein the tube extends away from the dripline when the spout clip is attached to the dripline.

12. The irrigation system of claim 1 wherein the at least one drip emitter and the dripline form an outlet bath and the tube extends through the at least one hole into the outlet bath.

13. The irrigation system of claim 1 wherein the tube is sized for attachment to a distribution tube.

14. The irrigation system of claim 13 further comprising one or more ribs extending about the spout and sized to receive a portion of a distribution tube.

15. The irrigation system of claim 13 wherein the spout clip further includes one or more ribs extending about the tube and sized to receive an end portion of the distribution tube therein with a friction engagement.

16. The irrigation system of claim 1 wherein the clip includes two elastically deflectable arms configured to receive the dripline therebetween to secure the spout clip to the dripline.

* * * * *